July 1, 1941.   R. T. OSMAN   2,247,664
PUSH CONNECTOR FOR VEHICLES
Filed March 25, 1940

INVENTOR.
Ralph T. Osman
BY
Robber Cobb
ATTORNEYS

Patented July 1, 1941

2,247,664

UNITED STATES PATENT OFFICE 2,247,664

PUSH CONNECTOR FOR VEHICLES

Ralph T. Osman, Milwaukee, Wis., assignor to Koehring Company, Milwaukee, Wis., a corporation Application March 25, 1940, Serial No. 325,917

1 Claim. (Cl. 280—33.13)

This invention relates to a push connector for transmitting a driving force from a driving to a driven vehicle. More specifically, the invention relates to a push connector for transmitting a driving force from a tractor vehicle to a dirt scraper and hauling vehicle.

The type of dirt scraper for which this invention is particularly adapted comprises a trailer scraper body supported at one end on a wheeled axle and at its other end on a traction vehicle. During the scraping action, the scraper body is lowered into contact with the ground for an excavating action and a load of dirt is scraped into the scraper body and the body is thereafter elevated and the load of dirt is hauled away. The power needed for the scraping or excavating action is much greater than is needed for the hauling action and to provide the traction vehicle constituting a part of the scraper with a motor of sufficient power to accommodate for both the scraping and hauling actions would be exceedingly costly.

Accordingly, it is advisable that an auxiliary power vehicle such as a tractor be employed for assisting in the scraping action and that the traction vehicle to which the scraper body is connected be provided with a motor of sufficient power to take care of the hauling action, the traction vehicle motor being utilized to assist the tractor during the scraping action. In this manner, several scrapers may be used on a single job and only one tractor need be provided for assisting in the scraping action, thereby materially decreasing the cost of the power equipment required.

In order that the tractor may be employed to assist in the scraping or excavating action, it is necessary to provide parts on the tractor and scraper which are engageable to transmit a driving force from the tractor to the scraper. However, by reason of irregularities in the surface of the ground on which the vehicles are being operated, there is a tendency for such parts to move out of engagement and permit other parts of the equipment to come into contact and be damaged by such contact. Moreover, when the scraper is being used in an excavating operation, where the scraper comprises a trailer vehicle connected to a traction vehicle, there is sometimes a tendency for the scraper body to move out of its desired path of travel as directed by the steering mechanism on the traction vehicle constituting a part of the scraper.

Accordingly, one of the principal objects of this invention is to provide a push connector having engageable parts connected to the scraper body and a tractor for transmitting a driving force from the tractor to the scraper body together with instrumentalities for interlocking such parts to prevent movement of such parts out of engagement during the time the driving force is being transmitted.

A further object is to provide a push connector for transmitting force from a tractor to a scraper comprising a bumper member mounted on the scraper vehicle and a push plate mounted on the tractor and having a flange part interlockingly engageable with the bumper for preventing relative lateral movement of the bumper with respect to the tractor out of engagement with the push plate on the tractor.

A further object is to provide a push connector for transmitting force from a tractor to a trailer scraper body by which the direction of travel of the trailer scraper body may be controlled from the tractor.

Other objects and advantages of the invention will become apparent during the course of the following description.

In the drawing, there is shown a preferred embodiment of the invention. In this showing:

Figure 1:
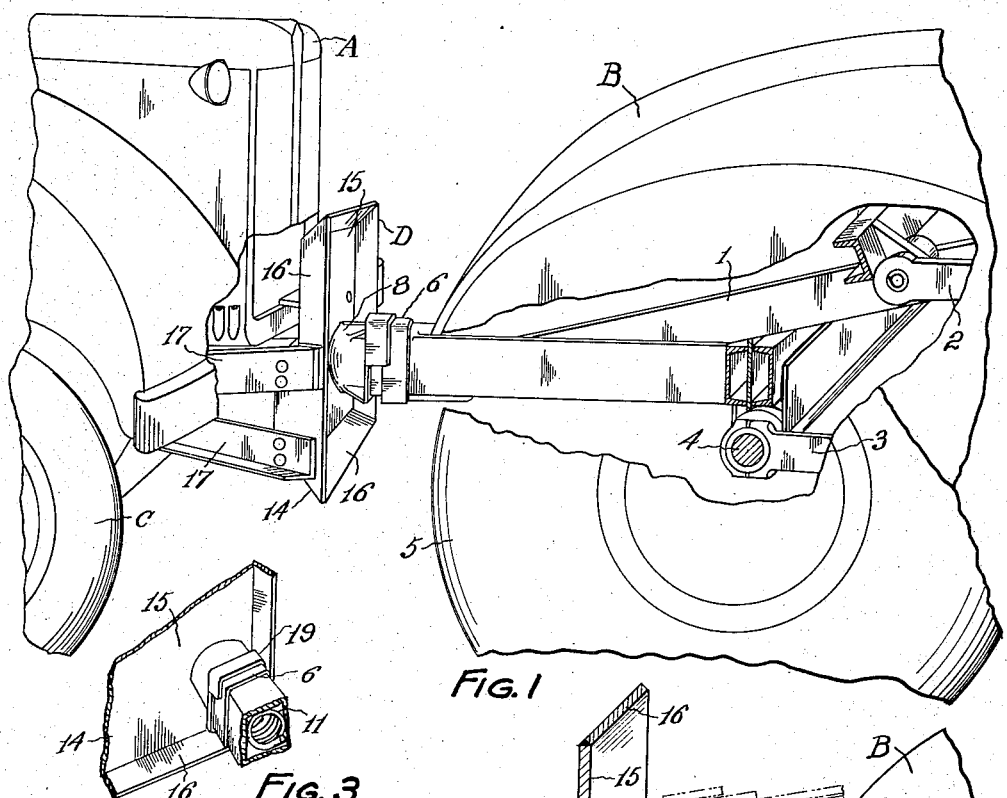
Figure 1 is a broken away view of a scraper and a tractor, showing in perspective the parts employed for transmitting a driving force from the tractor to the scraper.

Referring to the drawing, the letter A designates a tractor, a part thereof being broken away, which is employed for transmitting a driving force to a scraper designated by the letter B, a part thereof being broken away. The tractor A may be of any construction provided with traction supports C connected to conventional steering mechanism provided on such vehicles for controlling the direction of travel of the tractor A independent of the direction of travel of the scraper B.

The scraper B is preferably of the type illustrated and described in the copending application of George A. Vaughn, filed November 14, 1939, Serial Number 304,427. It will be understood, however, that this invention is not limited to any particular construction of vehicle to which it is desired to transmit a driving force from another vehicle, the invention being limited to the driving connection designated as a whole by the letter D which is employed for transmitting a driving force from the vehicle A to the vehicle B.

Referring to the scraper B, the part shown provides a rear support for a scraper body (not shown) which is connected at its other end to a traction vehicle constituting a part of the scraper which is used for hauling away dirt which has been scraped into the scraper body in a manner well known in the art. The part shown comprises a supporting frame 1 having links 2 and 3 pivotally connected thereto, the scraper body (not shown) being pivotally connected to the links 2 and 3 to permit raising and lowering movement of the scraper body with respect to the supporting frame 1. In this manner, the scraper body (not shown) may be raised and lowered with respect to the ground and in a sense is a trailer vehicle with respect to the traction vehicle to which it is connected at its front end and which comprises a part of the scraper B. The supporting frame 1 is pivotally mounted on an axle 4 carrying wheels 5 and has a pivotal movement imparted thereto during raising and lowering movements of the scraper body.

A bumper, indicated as a whole by the numeral 6, and constituting a part of the driving connection D, is rigidly connected to the supporting frame 1 and projects rearwardly with respect to the scraper B as best shown in Figure 1. The bumper 6 comprises a supporting member 7 and a bumper part 8. The supporting member 7 is a hollow sleeve-like member rigidly secured to a plate 9 which is an integral part of the supporting frame 1. The bumper member 8 is provided with an inwardly extending sleeve member 10 which is slidably receivable in the supporting sleeve member 7. A coil spring 11 is mounted within the supporting sleeve 7 and the sleeve 10, and abuts against the plate 9 and the bumper part 8 to maintain the bumper part 8 in an outward position with respect to the plate 9 and the sleeve 7. Bolts 12 having nuts 13 engageable with the plate 9 are integrally secured to the sleeve 10 as by welding to the sleeve 10 for limiting outward movement of the bumper 8 with respect to the plate 9, the bolts 12 being passed through openings in the plate 9 to permit inward movement of the bumper 8 and sleeve 10 with respect to the plate 9 and sleeve 7.

The bumper 6 is adapted to transmit a driving force to the scraper B through the supporting frame 1. The spring 11 is compressible upon the application of such a driving force to absorb the shocks which would otherwise be transmitted directly to the supporting frame 1 upon the initial application of such driving force to the bumper 6.

The driving connection D also includes a pusher plate, indicated as a whole by the numeral 14, and comprising a substantially flat plate 15 having flanges 16 integrally secured to the peripheral edges thereof and extending outwardly therefrom with respect to the tractor A. The pusher plate 14 is connected to the tractor A by supporting members 17 extending inwardly from the supporting plate 14 and rigidly secured to the pusher plate 14 and the frame of the tractor A.

In operation, to transmit a driving force from the tractor A to the scraper B, it is merely necessary to bring the surface 15 of the pusher plate 14 into engagement with the bumper 6 and the tractor A may then be used to impart a driving force to the scraper B. The area of the surface 15 is considerably larger than the area of the end 18 of the bumper 8 to permit movement of the bumper 8 with respect to the surface 15. Upon movement of the bumper 8 to a position adjacent the peripheral edges of the surface 15, the bumper 8 will interlockingly engage with the flanges 16 to prevent movement of the bumper 8 out of engagement with the surface 15. In this manner, the flanges 16 operate to maintain the bumper 8 in engagement with the pusher plate 14 and prevent movement of such parts out of engagement when the tractor A is being used to transmit the driving force to the scraper B.

Since the scraper B is in a sense a trailer vehicle, it will be understood that there will at times be a tendency for the wheels 5 and the rear part of the scraper B to move out of the path of travel as normally determined by the traction vehicle which supports the scraper B at its front end. This condition frequently results where the scraper B is being operated on a sloping surface and there is a tendency of the rear wheels 5 and the rear part of the scraper B to slide down such surface. In such case, the driving connection D may be used to control the path of travel of the rear of the scraper B from the steering mechanism provided on the tractor A. By reason of the interlocking engagement of the bumper 6 with the pusher plate 14, the driving connection D may be employed to keep the scraper B in line with the traction support provided at the forward end of the scraper B. This action is best illustrated by the diagrammatic illustration of Figure 3.

Figure 3:
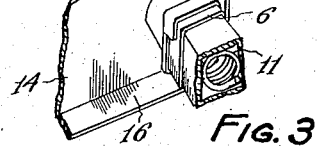
Figure 2:
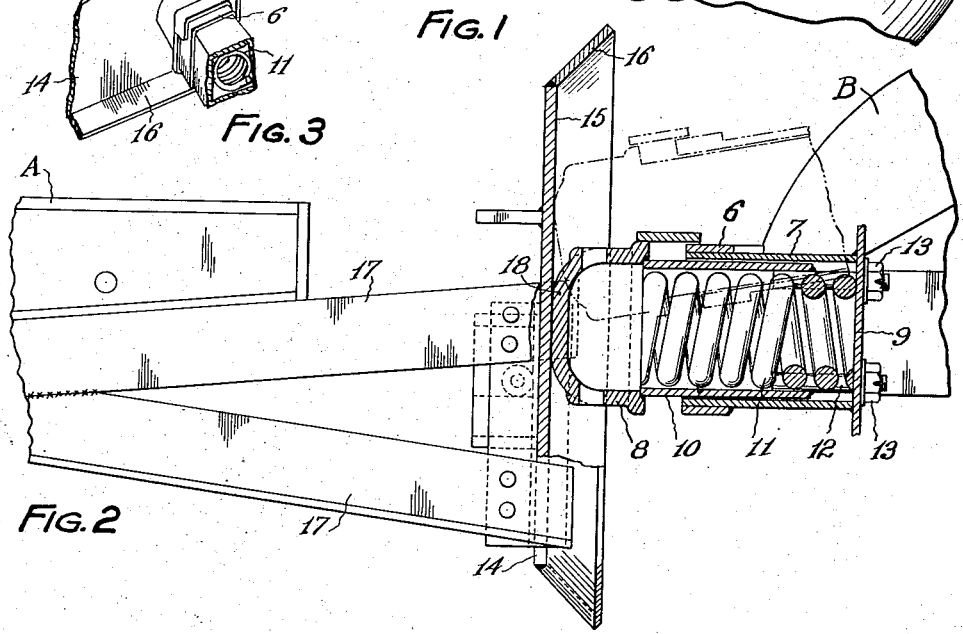
Figure 2 is a side elevational view of the driving connection shown in Figure 1, parts thereof being broken away, and parts being shown in section; and, Figure 3 is a broken away perspective view of a pusher plate and bumper indicating the position of the bumper member when in interlocking engagement with parts of the pusher plate.

Assuming the scraper B to be operating on a slope such that the rear of the scraper B will tend to move to the right with respect to the tractor A, then the bumper 6 will move into interlocking engagement with the portion 19 of the flanges 16, as shown in Figure 3, and further movement of the scraper B with respect to the tractor A will thereby be prevented.

Accordingly, it will be apparent that the pusher plate 14 may be used to control the path of travel of the scraper B by reason of the interlocking engagement of the bumper 6 with the pusher plate 14 in addition to preventing movement of the bumper 6 out of engagement with the pusher plate 14 by reason of irregularities in the surface of the ground over which the tractor A and scraper B are being operated.

Although the invention has been described as particularly adapted for transmitting a driving force to a scraper, it will be understood that the bumper 6 and pusher plate 14 may be used in any case where it is desired to transmit a driving force from one vehicle to another without departing from the spirit of this invention.

Having thus described my invention, what I claim as new and desire to secure by Letters Patent of the United States, is:

Driving connecting means for transmitting a driving force between a driving and driven vehicle comprising a pushing device including a substantially flat perpendicular plate provided with an outer flat pushing surface, a bumper member adapted to be supported by a driven vehicle and having a portion adapted to engage and shift over the surface of the flat plate incident to the pushing action of the latter when carried by a driving vehicle, supporting means for the said flat plate structure to carry same upon a driving vehicle, said flat plate structure being provided at its edges with flange portions to resist the disengagement of the bumper member from the flat pushing surface of the flat plate, said flat plate being of many times the area of the bumper member so that the latter may freely shift over the surface of the plate in the pushing action of the latter without tendency of the plate to shift the bumper member in a vertical or horizontal direction or combinations of such directions.

RALPH T. OSMAN.